US009549089B1

United States Patent
Tredoux et al.

(10) Patent No.: US 9,549,089 B1
(45) Date of Patent: Jan. 17, 2017

(54) SYSTEM AND METHOD FOR NETWORK ACCESS DISCOVERY

(71) Applicant: Xerox Corporation, Norwalk, CT (US)

(72) Inventors: Gavan Leonard Tredoux, Penfield, NY (US); Roger T. Kramer, Rochester, NY (US); Premkumar Rajendran, Fairport, NY (US); Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/834,919

(22) Filed: Aug. 25, 2015

(51) Int. Cl.
| | |
|---|---|
| *G06F 15/00* | (2006.01) |
| *G06F 3/12* | (2006.01) |
| *G06K 1/00* | (2006.01) |
| *G06K 15/00* | (2006.01) |
| *H04N 1/00* | (2006.01) |
| *H04W 4/00* | (2009.01) |
| *H04N 1/44* | (2006.01) |

(52) U.S. Cl.
CPC ...... *H04N 1/00307* (2013.01); *H04N 1/00204* (2013.01); *H04N 1/00244* (2013.01); *H04N 1/4413* (2013.01); *H04N 1/4433* (2013.01); *H04W 4/008* (2013.01); *H04N 2201/006* (2013.01); *H04N 2201/0094* (2013.01)

(58) Field of Classification Search
CPC ............ H04N 1/00307; H04N 1/00204; H04N 1/00244; H04N 1/4413; H04N 1/4433; H04N 2201/0094; H04N 2201/006; G06F 3/1296; G06K 15/02
USPC .............................. 358/1.1, 1.14, 1.15, 1.13
See application file for complete search history.

(56) References Cited

U.S. PATENT DOCUMENTS

| | | | |
|---|---|---|---|
| 2011/0063663 A1 | 3/2011 | Kim et al. | |
| 2015/0189023 A1* | 7/2015 | Kubota | H04L 67/141 455/7 |
| 2015/0363141 A1* | 12/2015 | Fernandes | H04W 4/003 358/1.15 |

* cited by examiner

*Primary Examiner* — Douglas Tran
(74) *Attorney, Agent, or Firm* — Fox Rothschild LLP

(57) ABSTRACT

A method for establishing a network connection between a mobile electronic device and a target network device includes establishing a short-range communications link between the mobile electronic device and the target network device. The method may also include, by a processor, executing an application that causes the processor to receive network device information from the target network device, via the short-range communications link, use the identifier associated with the target network device to identify a network to which the target network device is connected, use a transmitter component of the mobile electronic device to establish the network connection between the mobile electronic device and the target network device, via the identified network, and cause the transmitter component to send a communication to the target network device, via the identified network. The network device information comprises an identifier associated with the target network device.

27 Claims, 3 Drawing Sheets

SYSTEM AND METHOD FOR NETWORK ACCESS DISCOVERY

BACKGROUND

Mobile devices such as smartphones, notebook and laptop computers, PDAs (personal digital assistants), tablet computing devices, and so forth, are extremely prolific, and are extensively used to provide convenient storage and/or printing of various documents and data. Such devices are able to store the documents and data of the user, and allow the user to access such information in many different locations. When users with such mobile devices wish to print documents, files or other information stored on the mobile devices, information is transmitted via a print aware mobile application to a print device directly or through an intermediate processing device using mechanisms such as print.

Printers/multifunction-devices designed for use in a network environment routinely offer greater functionality than a simple desktop printer such as the printer can be managed, monitored, and configured directly from a standard web browser or any web-enabled application. Examples of network connected devices may include scanners, readers, fax machines, label makers, multifunction devices (MFD), or servers. When a user wishes to use one of the networked devices, a connection program may presents the user with a list of all networked devices (such as printers) based on selection criteria provided by the user.

However, there are many situations in which users may not know how to connect to a network of the selected device, such as a wireless network, in order to connect to the device and perform tasks. One issue is that MFDs and mobile devices often reside on different networks. This difference makes a direct connection between MFD and mobile hard to accomplish because this typically requires credentials for accessing that network, not to mention prior knowledge of the configuration parameters required. For example, a user may want to use a multifunction device via their mobile, over an enterprise WiFi network. However, there may be more than one network service set identifiers (SSIDs) visible to the user, and the user may not know which one to use in order to gain access to the selected device. Existing pairing solutions involving the use of NFC hotspots, passive NFC tags, Bluetooth Low Energy (BLE) tags or transmitters and so on are well-known, but do not solve this problem. Instead, such pairing solutions merely solve the problem of identifying the network address (IP or hostname) of the specific device in order to communicate with it, and do not address the problem of how one should connect to the surrounding enterprise network in order to be able to reach that specific device. Moreover, existing solutions introducing surrounding network information (such as which SSID to connect to, and how) would reintroduce administrative overhead in setting up such information, especially as it may change over time. The above problems may be exacerbated for MFDs hard wired to a network and as such do not know the network topology of the network and/or the wireless network information.

As such, a mobile device may only connect to a print device by first connecting to the print device network, which may be different from the mobile device network.

The current disclosure discloses a system and method to automatically determine the correct surrounding network information to use when connecting a mobile device to a network in order to use a resource, such as an MFD with minimal effort.

SUMMARY

A method (and system) for establishing a network connection between a mobile electronic device and a target network device may include by a short-range communications device of the mobile electronic device, establishing a short-range communications link between the mobile electronic device to the target network device. The method may further include by a processor, executing a print application that causes the processor to receive network device information from the target network device, via the short-range communications link. The network device information may include an identifier associated with the target network device. Executing the print application may also cause the processor to: use the identifier associated with the target network device to identify a network to which the target network device is connected, use a transmitter component of the mobile electronic device to establish the network connection between the mobile electronic device and the target network device, via the identified network, and cause the transmitter component to send a communication to the target network device, via the identified network.

In an embodiment, the method may also include storing the network device information and a set of parameters associated with the identified network in association with the target network device. In some embodiment, the set of parameters associated with the identified network may include a service set identifier (SSID), security credentials, authentication information, proxy information, firewall, or network protocol parameters, of the identified network.

In at least one embodiment, the target network device may be a print device, and the communication sent to the target network device, via the identified network, may be a print document.

In certain embodiments, using the identifier associated with the target network device to identify a network to which the target network device is connected may include: determining whether the mobile electronic device is connected to a mobile electronic device network; using the received network device information to determine whether a connection can be established between the mobile electronic device and the target network device, via the mobile electronic device network, upon determining that the mobile electronic device is connected to the mobile electronic device network; and identifying the mobile electronic device network as the network to which the target network device is connected, upon determining that a connection can be established between the mobile electronic device and the network device, via the mobile electronic device network. In an embodiment, using the identifier associated with the target network device to identify a network to which the target network device is connected may further include: using the identifier associated with the target network to determine whether a record comprising an identity of the network to which the target network device is connected exists, in a metadata server, if it is determined that the mobile electronic device is not connected to a mobile electronic device network; and using the record to identify the network to which the target network device is connected.

In at least one embodiment, using the identifier associated with the target network device to identify a network to which the target network device is connected may also include prompting a user of the mobile electronic device to identify the network, if it is determined that a record comprising an identity of the network to which the target network device is connected does not exist in a metadata server, and/or if the transmitter component of the mobile electronic device fails to establish the network connection between the mobile electronic device and the target network device, via the identified network, and/or if a connection cannot be established between the mobile electronic device and the network device, via the mobile electronic device network. Additionally and/or optionally, the method may also include replacing the record comprising an identity of the network to which the target network device is connected, in the metadata server, with a new record comprising a new identity of the network identified by the user. In at least one embodiment, the target network device may be a print device, and the communication sent to the target network device, via the identified network, may be a print document.

In another aspect, a non-transitory computer-readable medium including a plurality of programming instructions is disclosed. The plurality of programming instructions when executed by a processor may cause the processor to: receive network device information from a target network device, wherein the network device information comprises an identifier associated with the target network device; use the identifier associated with the target network device to identify a network to which the target network device is connected; use a transmitter component of a mobile electronic device to establish a network connection between the mobile electronic device and the target network device, via the identified network; and cause the transmitter component to send a communication to the target network device, via the identified network. In an embodiment, the plurality of programming instructions may be installable on a mobile electronic device. Alternatively and/or additionally, the plurality of programming instructions may be installable on a remote cloud-based server.

In an embodiment, the non-transitory computer-readable medium may further include comprising programming instructions that, when executed cause the processor to store the network device information and a set of parameters associated with the identified network in association with the target network device.

In certain embodiments, the plurality programming instructions that, when executed cause the processor to use the identifier associated with the target network device to identify a network to which the target network device is connected may include programming instructions to: determine whether the mobile electronic device is connected to a mobile electronic device network; use the received network device information to determine whether a connection can be established between the mobile electronic device and the target network device, via the mobile electronic device network, upon determining that the mobile electronic device is connected to the mobile electronic device network; and identify the mobile electronic device network as the network to which the target network device is connected, upon determining that a connection can be established between the mobile electronic device and the network device, via the mobile electronic device network.

In at least one embodiment, the plurality programming instructions that, when executed cause the processor to use the identifier associated with the target network device to identify a network to which the target network device is connected may include programming instructions to: use the identifier associated with the target network to determine whether a record comprising an identity of the network to which the target network device is connected exists, in a metadata server, if it is determined that the mobile electronic device is not connected to a mobile electronic device network; and use the record to identify the network to which the target network device is connected. In yet another embodiment, the programming instruction may also include programming instructions to prompt a user of the mobile electronic device to identify the network, if it is determined that a record comprising an identity of the network to which the target network device is connected does not exist in a metadata server, and/or if the transmitter component of the mobile electronic device fails to establish the network connection between the mobile electronic device and the target network device, via the identified network.

Additionally and/or optionally, the programming instructions may further include programming instructions to replace the record comprising an identity of the network to which the target network device is connected, in the metadata server, with a new record comprising a new identity of the network identified by the user.

DETAILED DESCRIPTION

Figure 1:
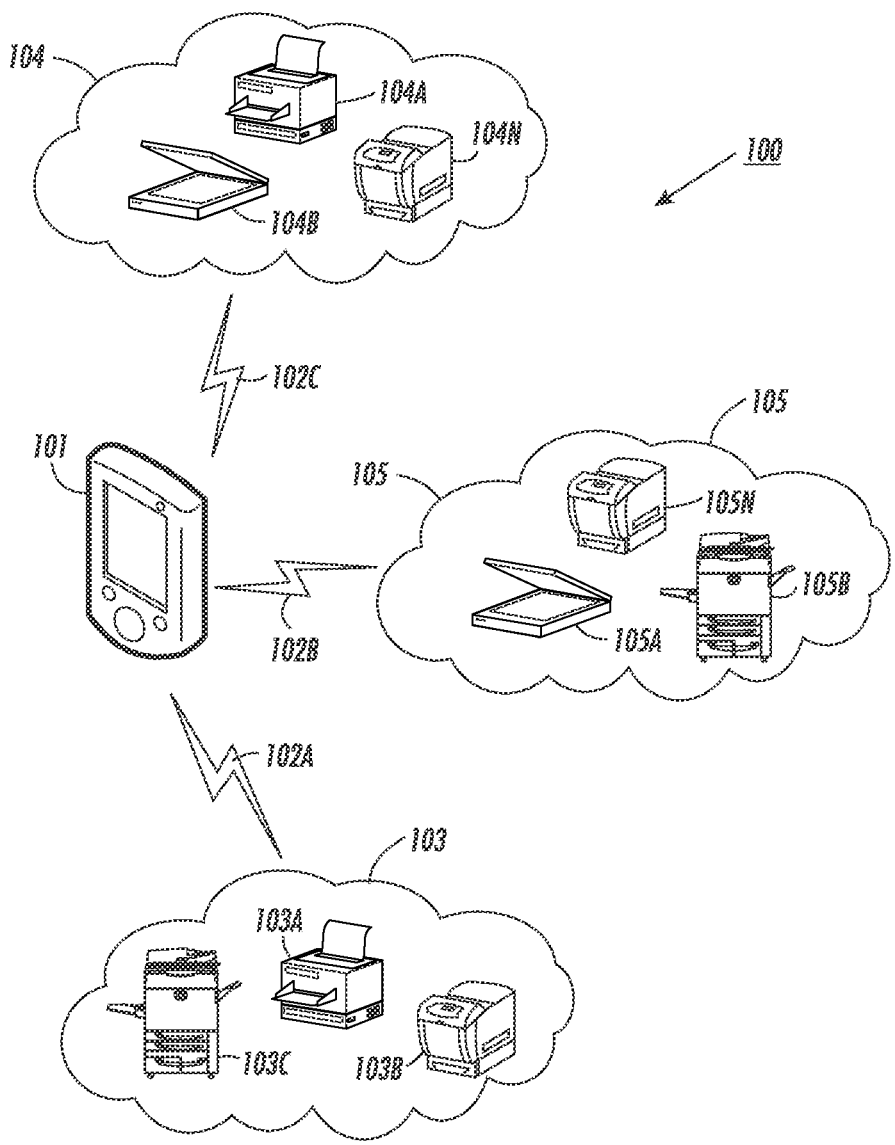
FIG. 1 is a schematic illustration of a system for automatically detecting a network device network and discovering network access parameters, according to an embodiment.

This disclosure is not limited to the particular systems, methodologies or protocols described, as these may vary. The terminology used in this description is for the purpose of describing the particular versions or embodiments only, and is not intended to limit the scope.

As used in this document, any word in singular form, along with the singular forms "a," "an" and "the," include the plural reference unless the context clearly dictates otherwise. Unless defined otherwise, all technical and scientific terms used in this document have the same meanings as commonly understood by one of ordinary skill in the art. All publications mentioned in this document are incorporated by reference. Nothing in this document is to be construed as an admission that the embodiments described in this document are not entitled to antedate such disclosure by virtue of prior invention. As used in this document, the term "comprising" means "including, but not limited to."

A "mobile device" or "mobile electronic device" refers to a portable computing device that includes short range wireless communication interface such as an NFC tag, a processor and non-transitory, computer-readable memory. The memory may contain programming instructions in the form of a software application that, when executed by the processor, causes the device to perform one or more network access parameter identifying operations. Examples of suitable portable electronic devices include smartphones, personal digital assistants, cameras, tablet devices, electronic readers, personal computers, media players, satellite navigation devices and the like.

A "print device" refers to a device that includes a print engine for printing a document. The print device may also include a near field communication (NFC) interface used to communicate with one or more other devices, a processor that can process the document and a memory unit for storage of the documents or portions of the document. Any suitable print device can be used including, but not limited to, inkjet and laser print devices and multifunction devices.

The term "document" refers to a writing that provides information, the writing including text and/or images. The term "document" may include a text file, a Web page, a newsgroup posting, a picture, media, hyperlinks, etc. The document may, for example, include several areas consisting of text, and other areas consisting of images or graphics. The text, for example, may include narrative sections of some length, as well as titles and captions.

A "multi-function device" or "MFD," as used herein, refers to a machine comprising hardware and associated software configured for printing, as well as at least one other function such as copying, facsimile transmitting or receiving, scanning, or performing other actions on document-based data.

A "network" is a group of two or more computer systems or electronic devices linked together for purposes of sharing data and resources, wherein each network is identified by a service set identifier (SSID). The connection between computer systems can be done via cabling, such as the Ethernet cable, or wirelessly through wireless communication signals. Connected computers can share resources, like access to the Internet, printers, file servers, and others, as well as information in the form of data. Examples may include, without limitation, a local area network (LAN) such as WiFi network, Bluetooth network, etc.; a wide area network (WAN) such as internet and intranet; and other such networks.

Use of the terms "coupled" and "connected", along with their derivatives, may be used. "Coupled" may be used to indicate that two or more elements are in either direct or indirect (possibly with other intervening elements between them) physical, communicative, or electrical contact with each other, and/or that the two or more elements co-operate or interact with each other. Coupling means establishing a paired communication link whereby the devices recognize each other and transmit information via NFC or a short range communication protocol.

FIG. 1 is a block diagram illustrating a system 100 for network printing from a mobile electronic device 101, in accordance with the principles of the current disclosure. FIG. 1 shows a plurality of networks (103, 104, 105, and so on) that may establish communication links 102(*a*), 102(*b*), and/or 102(*c*), respectively, with the mobile device 101. In an embodiment, each of the plurality of networks may include one or more network connected devices (103(*a*), 103(*b*), 103(*c*) . . . 103(*n*); 104(*a*), 104(*b*), 104(*c*) . . . 104(*n*); and 105(*a*), 105(*b*), 105(*c*) . . . 105(*n*)). Examples of network devices may include, without limitation, fax device 103(*c*), multifunction device 103(*b*), copier 104(*a*), scanner 104(*b*), and print device 103(*a*).

Each network may have an associated network profile. The network profile may include, for example, an SSID or other identifier of the network, configuration parameters, security credentials, authentication information, proxy information, firewall, and network protocol parameters. As discussed previously, a mobile device user may not know the network and associated network parameters (amongst the plurality of networks), to which a network device is connected, when the user wishes to connect to the network device.

The network devices may include Bluetooth™, near-field communication (NFC), or other short-range communications hardware components (in addition to and different from, any other network connection communication components that the device may have) that allows for contactless communication between devices that are located very close to one another. In certain embodiments, a short-range communications link established with a network device may also be configured to cause the mobile device to perform certain processing actions, such as launching of applications, navigating to a particular website, or downloading of a particular file.

Short-range communications require close proximity (e.g., no more than a few inches, or in some cases no more than one or two feet) to establish a communications link, and hence the operation of establishing a link with another device may be referred to as a "tap." The term "tap" as used herein does not necessarily refer to physical contact between communicating devices, but rather positioning the devices in sufficiently close proximity to establish a communications link. For example, a user of an NFC or Bluetooth enabled smart phone may tap an NFC or Bluetooth tag to send and/or receive data from the tag.

Near field communications are defined by a collection of standards for radio frequency communications that may be used when two devices are in close proximity. Protocols for implementation of near field communication may comply with industry standards, such as ISO/IEC 18092 or ISO/IEC 18000-3, published by the International Standards Organization. Typical ranges for near field communications are approximately 10 cm or less, although it may be 20 cm or less, 4 cm or less, or other ranges. Near field communications can support two-way (or peer-to-peer) communications between devices. In a passive mode, an NFC initiator device may output a carrier field that a target device (or transponder) uses to respond by modulating the provided field. In an active mode, the initiator and the target can each generate a carrier field, and the devices communicate by altering the fields. When utilizing two-way communications, two devices may exchange data to perform various functionalities that are enabled as a result of the near field communications. In some embodiments, the NFC interface of a network device can be embodied as a circuit or similar electronic component or components. As an example, each device may be equipped with an NFC tag that permits NFC communication between the devices. An NFC tag may be simply affixed to network device as a static tag, or the tag may be integrated into the communications interface of network device as a dynamic tag that is powered by the network device.

For simplicity, in the document, the term "short range communication" or NFC may interchangeably refer to either a short range communication protocol or an NFC protocol.

In this document, the terms "print application" and "print software" refer to a software application that is configured to cause an electronic device to perform some or all of the functions that are described in this disclosure. The mobile device may have a print application pre-configured on the mobile device. Alternatively and/or additionally, the user of a mobile device may download and install a print application onto the mobile device. The user may acquire the application by downloading it from an application store or from a print service provider. In certain embodiments, the print application may be pre-installed on the mobile device. The print application may include virtually any application type which may run on any underlying operating system or platform. The installed print application may register itself with the mobile operating system allowing the application to monitor certain activities on the mobile operating system, and using the functionalities of the operating system. The print application operates to identify a network and connect the mobile device to a print device, via the identified network, as discussed later.

The print application may correspond to a local application which executes on the mobile device. Alternatively, the print application may represent a web application which executes on a remote application server. That is, the print application may include any application functionality which is accessed by the user over a network and experienced locally as application e.g., using a browser running on the mobile device. The print application may include or have access to a database of information. In certain embodiments, the database may be exported to another local device or to a cloud-based repository. Techniques for executing such a web application, and related technology, are well known in the art and are therefore not described further in detail herein, except as may be helpful or necessary to understand operations of the system.

Figure 2:
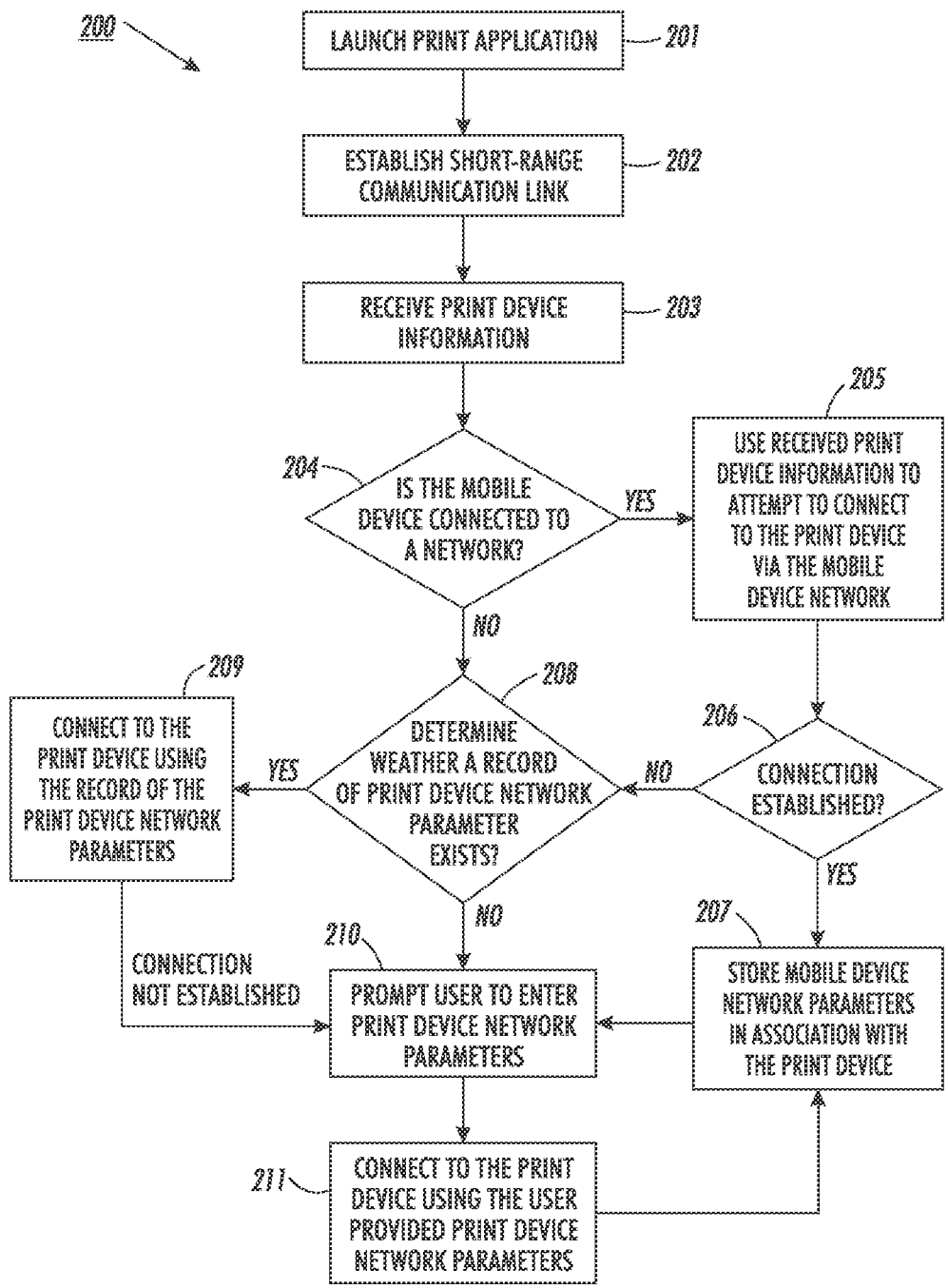
FIG. 2 depicts a flow chart example of a automatically detecting a network device network and discovering network access parameters using a mobile device, according to an embodiment.

FIG. 2 depicts a flow chart example of a process for automatically detecting a print device network and coupling the print device to the mobile device, according to an embodiment.

Although FIG. 2 and the discussion below refers to print devices and print application, the embodiments encompass other types of network devices and their associated applications as well.

There may be one or more scenarios under which the print application will launch 201 on the mobile device. In certain embodiments, the network application may launch automatically when the desired or selected print device (or other network device) is recognized as proximate (i.e., when the print device is within a detection range of the device's network short-range communication elements). For example, the user may couple the mobile device to the print device by bringing the NFC enabled mobile device within a communication range of the NFC tag attached to and/or incorporated within the print device (i.e., tap as discussed previously), and the NFC enabled mobile device may respond to a field generated by a NFC enabled print device and launch the print application. In certain other embodiments, the user may manually launch the network application by activating it on a screen of the device and/or by voice command, such as by a command t print a document.

In step 202, upon launch, the print application may establish a short-range communications link between the mobile device and the print device. For example, in an embodiments, the short-range communication link may be established to couple the mobile device and the print device, via an NFC protocol.

Such NFC coupling allows the user to couple the mobile device to the print device without having to exit any applications running on the mobile device. While the current example relies on NFC to establish the initial connection between a mobile device and a print device, it will be apparent to those skilled in the art that other short-range wireless communication protocols may also be used in accordance with the principles of the current disclosure.

Prior to the start of establishing the NFC connection, the mobile device may be in a "wake on NFC" mode. In this mode, the NFC interface of the mobile device may remain inactive until the NFC interface receives an NFC signal from another NFC interface. At the same time, NFC interface of the print device may be in a host mode. In the host mode, the NFC interface of the print device may periodically emit NFC signals to seek out other nearby NFC interfaces.

The establishment of the NFC connection in step 201 may begin with an initiation handshake. The initiation handshake may start when a user taps the NFC interface of the mobile device to the NFC interface of the print device. As mentioned above, while the NFC interface of the print device may be in a host mode, it may periodically emit a ping message. NFC interface the mobile device may receive the ping message, causing the NFC interface of the mobile device to awake and reply with an acknowledgement message, which may be received by the NFC interface of the print device.

In certain embodiments, the short range communications link may also be used to initially authenticate the mobile device and/or the print device to ensure security of transmission. For example, the user may password protect access to the print application, and the print application may prompt the user to enter username and/or password upon launch, and/or select a desired print device from a plurality of available print devices before it will proceed to establish a short range-communications link with the print device or perform certain other functions. In certain embodiments, the above authentication information may be stored in the print application database for future use. This may reduce the number of steps for network configuration and control.

In step 203, the print application may detect and/or receive print device information and settings for connection to the print device network (i.e., the wireless communication network to which the print device is connected). In certain embodiments, the print application may receive the receive print device information and settings for connection to the print device network, via the short range communications link established in step 202. In certain embodiments, the detected information and settings of the print device may also be displayed to a user for authentication. According to one embodiment, the detected print device information and settings may include, without limitation, an identifier for the print device such as a device name, the network address of the print device (e.g., Bluetooth® address, IP address, MAC address, or the like), the default gateway, and/or one or more Domain Name Server (DNS) addresses. The retrieved information may be stored in the print application database.

Alternatively and/or additionally, in an embodiment, the mobile device may receive the print device information and settings from another sources (in which case a short-range communications link may or may not be established). Example of such other sources may include, without limitation, an associated database, and manual user entry.

In step 204, the print application may determine whether or not the mobile device is currently connected to a network. If the mobile device is connected to a network, the print application may use the information retrieved in step 203 (for example, the IP address of the print device) to attempt to connect 205 to the print device, via the mobile device network (i.e., the wireless communication network to which the mobile device is connected). If a connection is established (206) with the print device via the mobile device network, the print application may store 207 the network SSID and other network parameters (such as authentication protocol, proxy settings, security settings, or other similar information) relating to the mobile device network and the established connection in association with the print device (and identify the network as the print device network). The print application may use the print device information (such as the device identifier) detected in step 203 to associate the network parameters with the print device. For example, in an embodiment, the print application may use the network address of the print device to associate the print device with the network parameters. The print application may also store the information and settings detected in step 202 in association with the print device. In an embodiment, the print application may store the above information in, for example, a metadata server.

If the print application in step 204 determines that the mobile device is not connected to a network, and/or if the print application determines 206 that a connection cannot be establish with the print device, via the mobile device network in step 205 (such as, for example, if the mobile device network is not the same as the print device network), the print application may access a metadata server to determine 208 if a record of the print device network and associated parameters exists. In an embodiment, the print application may use the print device information (such as the device identifier) received in step 203 to determine whether a record (including network identity data and other parameters) of the print device network exists. For example, the print application may determine if a record of print device network exists by sending a request via the mobile device network to a metadata server and searching and/or parsing the metadata server database for the information retrieved in step 203, such as the print device network address, using techniques known to those skilled in the art.

If the print application determines that a record of print device network exists, the print application may use the recorded network identity and other parameters (and/or the print device information and settings) to connect 209 to the print device, via the print device network. This process may include causing a wireless transmitter component of the mobile device to disconnect from the mobile device network (if the mobile device was connected to a mobile device network) and instead connect to the print device network.

However, if the print application determines that a record of the print device network does not, the print application may prompt 210 a user of the mobile device to manually identify the print device network and enter the print device network parameters. The print device use the entered network parameters to connect 211 to the print device, via the identified print device network. The print application may store 207 the received print device network identity and parameters in association with the print device, for future use. The print application may use the print device information and settings detected in step 203 to associate the network identity and parameters with the print device. For example, in an embodiment, the print application may use the network address of the print device to associate the print device with the print device network and network parameters. The print application may also store the information and settings detected in step 203 in association with the print device. In an embodiment, the print application may store the above information in, for example, a metadata server.

In an embodiment, the above described process may be used to update the network information (identity and associated parameters) for a print device network every time a user establishes a connection between a mobile electronic device and a print device. For example, if in step 209, the print application is unable to establish a connection between the mobile electronic device and the print device using the existing record of the print device network, the print application may prompt a user of the mobile electronic device to enter print device network identity and parameters. The print application may then replace the metadata server record of the print device network with the user provided network identity and parameters.

It will be understood to those skilled in the art that while the current disclosure describes network access discovery using establishing connection to a print device as an example, the principles disclosed here can be used for network access discovery and establishing connections to other network devices such as fax machines, scanners, and the like.

Once a connection is established with the print device, the print application may send documents to be printed and/or other information to the print device using the established network connection. The print device may then print the received documents.

Figure 3:
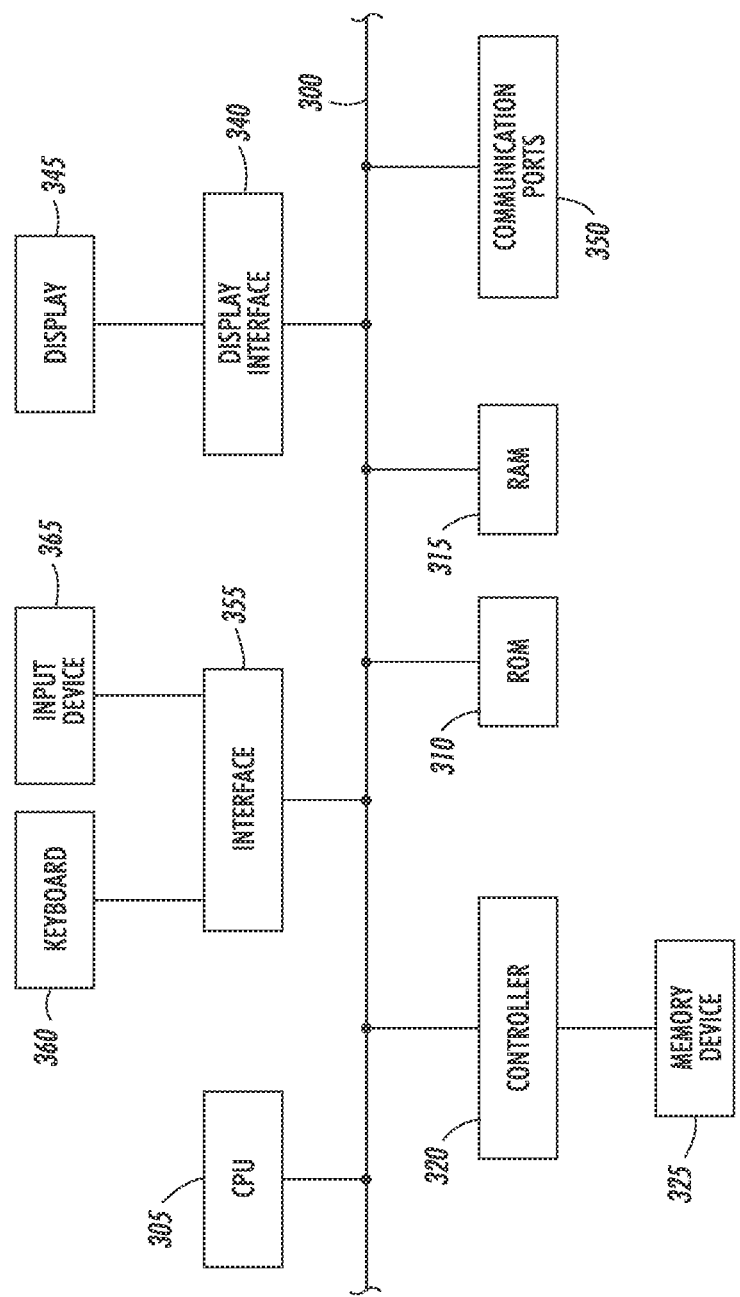
FIG. 3 depicts various embodiments of a mobile device for using the systems and processes described in this document.

The network access discovery method and process as described above may be performed and implemented by an operator of a mobile electronic device and/or a print device having a processor and a communications interface (including NFC). FIG. 3 depicts an example of internal hardware that may be used to contain or implement the various computer processes and systems as discussed above. For example, the mobile electronic device discussed above may include hardware such as that illustrated in FIG. 3. An electrical bus 300 serves as an information highway interconnecting the other illustrated components of the hardware. CPU 305 is a central processing unit of the system, performing calculations and logic operations required to execute a program. CPU 305, alone or in conjunction with one or more of the other elements, is a processing device, computing device or processor as such terms are used within this disclosure. A CPU or "processor" is a component of an electronic device that executes programming instructions. The term "processor" may refer to either a single processor or to multiple processors that together implement various steps of a process. Unless the context specifically states that a single processor is required or that multiple processors are required, the term "processor" includes both the singular and plural embodiments. Read only memory (ROM) 310 and random access memory (RAM) 315 constitute examples of memory devices. The term "memory device" and similar terms include single device embodiments, multiple devices that together store programming or data, or individual sectors of such devices.

A controller 320 interfaces with one or more optional memory devices 325 that service as date storage facilities to the system bus 300. These memory devices 325 may include, for example, an external or internal disk drive, a hard drive, flash memory, a USB drive or another type of device that serves as a data storage facility. As indicated previously, these various drives and controllers are optional devices. Additionally, the memory devices 325 may be configured to include individual files for storing any software modules or instructions, auxiliary data, incident data, common files for storing groups of contingency tables and/or regression models, and/or one or more databases for storing the information as discussed above.

Program instructions, software or interactive modules for performing any of the functional steps associated with the processes as described above may be stored in the ROM 310 and/or the RAM 315. Optionally, the program instructions may be stored on a non-transitory, computer readable medium such as a compact disk, a digital disk, flash memory, a memory card, a USB drive, an optical disc storage medium, and/or other recording medium.

An optional display interface 340 may permit information from the bus 300 to be displayed on the display 345 in audio, visual, graphic or alphanumeric format. Communication with external devices may occur using various communication components such as an antenna, transmitter component and/or receiver 350. A communication port 350 may be attached to a communications network, such as the Internet, a WiFi network, a local area network or a cellular telephone data network.

The hardware may also include an interface 355 which allows for receipt of data from input devices such as an imaging sensor 360 of a scanner or other input device 365 such as a keyboard, a mouse, a joystick, a touchscreen, a remote control, a pointing device, a video input device and/or an audio input device.

The above-disclosed features and functions, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

The invention claimed is:

1. A method for establishing a network connection between a mobile electronic device and a target network device comprising:
   by a short-range communications device of the mobile electronic device, establishing a short-range communications link between the mobile electronic device to the target network device;
   by a processor, executing a print application that causes the processor to:
      receive network device information from the target network device, via the short-range communications link, wherein the network device information comprises an identifier associated with the target network device,
      use the identifier associated with the target network device to identify a network to which the target network device is connected,
      use a transmitter component of the mobile electronic device to establish the network connection between the mobile electronic device and the target network device, via the identified network, and
      cause the transmitter component to send a communication to the target network device, via the identified network.

2. The method of claim 1, further comprising storing the network device information and a set of parameters associated with the identified network in association with the target network device.

3. The method of claim 2, wherein the set of parameters associated with the identified network comprises at least one of the following: a service set identifier (SSID), security credentials, authentication information, proxy information, firewall, or network protocol parameters, of the identified network.

4. The method of claim 1, wherein the target network device is a print device, and the communication sent to the target network device, via the identified network, is a print document.

5. The method of claim 1, wherein using the identifier associated with the target network device to identify a network to which the target network device is connected comprises:
   determining whether the mobile electronic device is connected to a mobile electronic device network;
   using the received network device information to determine whether a connection can be established between the mobile electronic device and the target network device, via the mobile electronic device network, upon determining that the mobile electronic device is connected to the mobile electronic device network; and
   identifying the mobile electronic device network as the network to which the target network device is connected, upon determining that a connection can be established between the mobile electronic device and the network device, via the mobile electronic device network.

6. The method of claim 5, wherein using the identifier associated with the target network device to identify a network to which the target network device is connected further comprises:
   if it is determined that the mobile electronic device is not connected to a mobile electronic device network, using the identifier associated with the target network to determine whether a record comprising an identity of the network to which the target network device is connected exists, in a metadata server; and
   using the record to identify the network to which the target network device is connected.

7. The method of claim 6, wherein using the identifier associated with the target network device to identify a network to which the target network device is connected further comprises prompting a user of the mobile electronic device to identify the network, if it is determined that a record comprising an identity of the network to which the target network device is connected does not exist in a metadata server.

8. The method of claim 6, further comprising, by the processor:
   prompting a user of the mobile electronic device to identify the network, if the transmitter component of the mobile electronic device fails to establish the network connection between the mobile electronic device and the target network device, via the identified network; and
   replacing the record comprising an identity of the network to which the target network device is connected, in the metadata server, with a new record comprising a new identity of the network identified by the user.

9. The method of claim 5, wherein using the identifier associated with the target network device to identify a network to which the target network device is connected further comprises prompting a user of the mobile electronic device to identify the network, if a connection cannot be established between the mobile electronic device and the network device, via the mobile electronic device network.

10. A system for establishing a network connection between a mobile electronic device and a network device comprising:
   one or more processors; and
   a non-transitory computer-readable medium containing programming instructions that, when executed by the one or more processors, cause the system to:
      establish a short-range communications link between the mobile electronic device and the target network device;
      execute a print software application on the mobile electronic device to:
         receive network device information from the target network device, via the short-range communications link, wherein the network device information comprises an identifier associated with the target network device,
         use the identifier associated with the target network device to identify a network to which the target network device is connected;
         use a transmitter component of the mobile electronic device to establish the network connection between the mobile electronic device and the target network device, via the identified network; and cause the transmitter component to send a communication to the target network device, via the identified network.

11. The system of claim 10, further comprising programming instructions that, when executed by the one or more processors cause the system to store the network device information and a set of parameters associated with the identified network in association with the target network device.

12. The system of claim 11, wherein the set of parameters associated with the identified network comprises at least one of the following: a service set identifier (SSID), security credentials, authentication information, proxy information, firewall, or network protocol parameters, of the identified network.

13. The system of claim 10, wherein the target network device is a print device, and the communication sent to the target network device, via the identified network, is a print document.

14. The system of claim 10, wherein the programming instructions that, when executed cause the system to execute a print software application on the mobile device to use the identifier associated with the target network device to identify a network to which the target network device is connected, further comprise programming instructions to:
  determine whether the mobile electronic device is connected to a mobile electronic device network;
  use the received network device information to determine whether a connection can be established between the mobile electronic device and the target network device, via the mobile electronic device network, upon determining that the mobile electronic device is connected to the mobile electronic device network; and
  identify the mobile electronic device network as the network to which the target network device is connected, upon determining that a connection can be established between the mobile electronic device and the network device, via the mobile electronic device network.

15. The system of claim 14, wherein the programming instructions that, when executed cause the system to execute a print software application on the mobile device to use the identifier associated with the target network device to identify a network to which the target network device is connected, further comprise programming instructions to:
  if it is determined that the mobile electronic device is not connected to a mobile electronic device network, use the identifier associated with the target network to determine whether a record comprising an identity of the network to which the target network device is connected exists, in a metadata server; and
  use the record to identify the network to which the target network device is connected.

16. The system of claim 15, wherein the programming instructions that, when executed cause the system to execute a print software application on the mobile device to use the identifier associated with the target network device to identify a network to which the target network device is connected, further comprise programming instructions to prompt a user of the mobile electronic device to identify the network, if it is determined that a record comprising an identity of the network to which the target network device is connected does not exist in a metadata server.

17. The system of claim 15, further comprising instructions to execute the print software application on the mobile device to:
  prompt a user of the mobile electronic device to identify the network, if the transmitter component of the mobile electronic device fails to establish the network connection between the mobile electronic device and the target network device, via the identified network; and
  replace the record comprising an identity of the network to which the target network device is connected, in the metadata server, with a new record comprising a new identity of the network identified by the user.

18. The system of claim 14, wherein the programming instructions that, when executed cause the system to execute a print software application on the mobile device to use the identifier associated with the target network device to identify a network to which the target network device is connected, further comprise programming instructions to prompt a user of the mobile electronic device to identify the network, if a connection cannot be established between the mobile electronic device and the network device, via the mobile electronic device network.

19. A non-transitory computer-readable medium comprising a plurality of programming instructions that, when executed by a processor, cause the processor to:
  receive network device information from a target network device, wherein the network device information comprises an identifier associated with the target network device;
  use the identifier associated with the target network device to identify a network to which the target network device is connected;
  use a transmitter component of a mobile electronic device to establish a network connection between the mobile electronic device and the target network device, via the identified network; and
  cause the transmitter component to send a communication to the target network device, via the identified network.

20. The non-transitory computer-readable medium of claim 19, further comprising programming instructions that, when executed cause the processor to store the network device information and a set of parameters associated with the identified network in association with the target network device.

21. The non-transitory computer-readable medium of claim 19, wherein the target network device is a print device, and the communication sent to the target network device, via the identified network, is a print document.

22. The non-transitory computer-readable medium of claim 19, wherein the plurality programming instructions that, when executed cause the processor to use the identifier associated with the target network device to identify a network to which the target network device is connected, further comprise programming instructions to:
  determine whether the mobile electronic device is connected to a mobile electronic device network;
  use the received network device information to determine whether a connection can be established between the mobile electronic device and the target network device, via the mobile electronic device network, upon determining that the mobile electronic device is connected to the mobile electronic device network; and
  identify the mobile electronic device network as the network to which the target network device is connected, upon determining that a connection can be established between the mobile electronic device and the network device, via the mobile electronic device network.

23. The non-transitory computer-readable medium of claim 22, wherein the plurality programming instructions that, when executed cause the processor to use the identifier associated with the target network device to identify a network to which the target network device is connected, further comprise programming instructions to:

if it is determined that the mobile electronic device is not connected to a mobile electronic device network, use the identifier associated with the target network to determine whether a record comprising an identity of the network to which the target network device is connected exists, in a metadata server; and use the record to identify the network to which the target network device is connected.

24. The non-transitory computer-readable medium of claim 23, wherein the plurality programming instructions that, when executed cause the processor to use the identifier associated with the target network device to identify a network to which the target network device is connected, further comprise programming instructions to prompt a user of the mobile electronic device to identify the network, if it is determined that a record comprising an identity of the network to which the target network device is connected does not exist in a metadata server.

25. The non-transitory computer-readable medium of claim 23, further comprising instructions to:

prompt a user of the mobile electronic device to identify the network, if the transmitter component of the mobile electronic device fails to establish the network connection between the mobile electronic device and the target network device, via the identified network; and replace the record comprising an identity of the network to which the target network device is connected, in the metadata server, with a new record comprising a new identity of the network identified by the user.

26. The non-transitory computer-readable medium of claim 19, wherein the plurality of programming instructions are installable on a mobile electronic device.

27. The non-transitory computer-readable medium of claim 19, wherein the plurality of programming instructions are installable on a remote cloud-based server.

\* \* \* \* \*